(No Model.)

J. B. LADD.
WEEDING MACHINE.

No. 298,863. Patented May 20, 1884.

Witnesses
G. F. Downing
George Cook

INVENTOR
J. B. Ladd.
By H. A. Simpson,
Attorney

UNITED STATES PATENT OFFICE.

JOSEPH B. LADD, OF NORTH TOPEKA, KANSAS.

WEEDING-MACHINE.

SPECIFICATION forming part of Letters Patent No. 298,863, dated May 20, 1884.

Application filed June 22, 1883. (No model.)

*To all whom it may concern:*

Be it known that I, JOSEPH B. LADD, of North Topeka, in the county of Shawnee and State of Kansas, have invented certain new and useful Improvements in Weeding-Machines; and I do hereby declare the following to be a full, clear, and exact description of the invention, such as will enable others skilled in the art to which it appertains to make and use the same.

My invention relates to an improvement in cultivators, the object of the same being to provide a device of this character which shall combine simplicity and economy in construction with durability and efficiency in use, and which will be more especially adapted for weeding purposes; and with these ends in view my invention consists in certain details of construction and combinations of parts, as will be hereinafter described, and pointed out in the claims.

Figure 1:
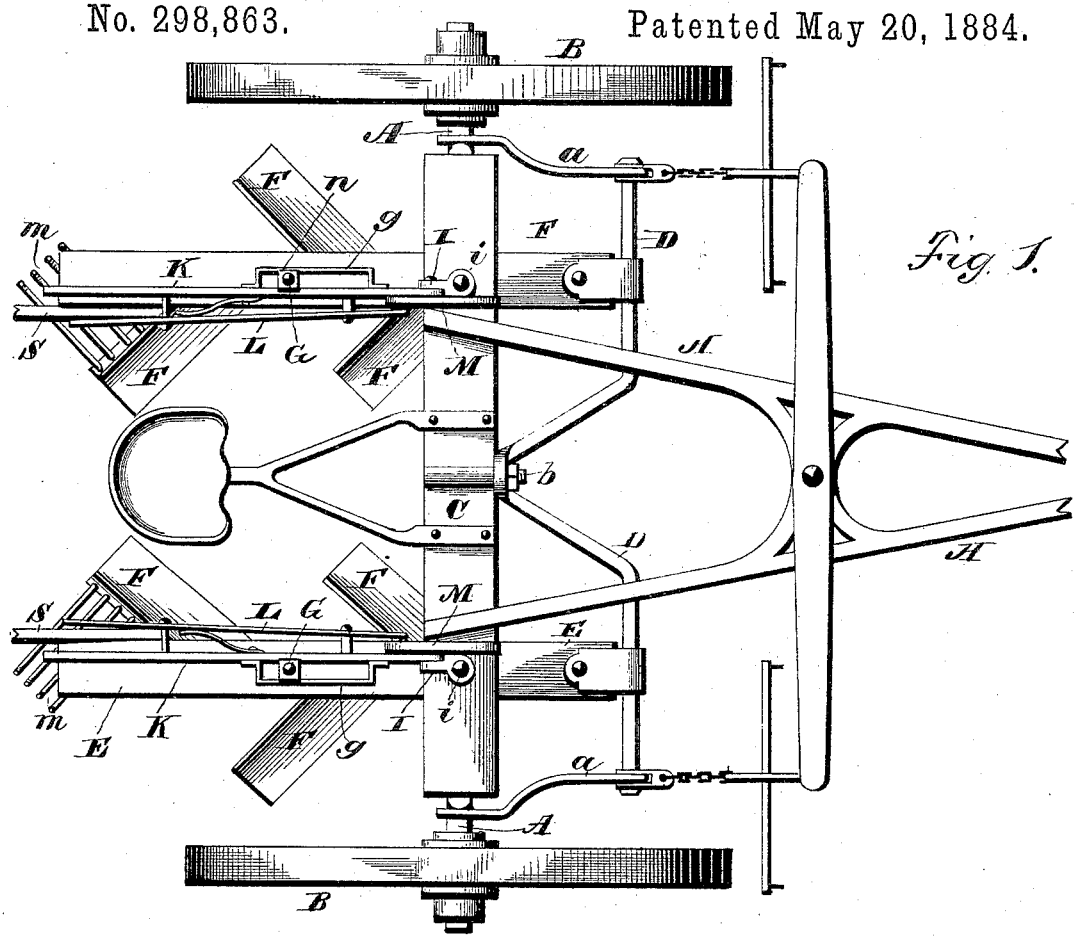
Figure 2:
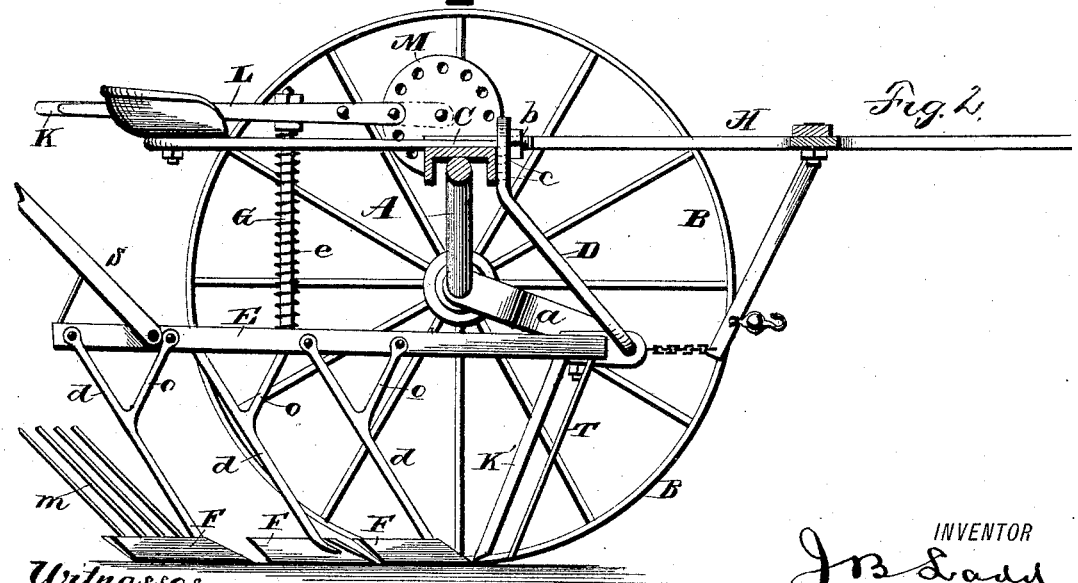

In the accompanying drawings, Figure 1 is a plan view of my improvement, and Fig. 2 is a view thereof in section.

A represents an arched axle, to which are secured the wheels B and the frame-piece C. To the latter is secured the bail D, the two lower ends of which are secured to the arms $a$, loosely secured to the crank ends of the axle A. The central portion of this bail, by means of the pin $b$, is secured to the frame-piece C, the said bail being provided with a series of perforations, $c$, in which is adapted to fit the pin $b$, thereby allowing the bail to be raised or lowered, as desired. To the horizontal portions of the bail D are loosely secured the drag-bars E, to which are secured the standards $d$, the latter being provided on their lower ends with the shovels F, the front ends of which are pointed, as shown. The rear side of each shovel may be provided with a series of perforations, in which are inserted trailing wires $m$ or their equivalents. These wires may be straight, twisted, or bent in any form desired, and are for the purpose of facilitating the separation of the weeds and dirt, and to more thoroughly pulverize the broken ground. If desired, these wires $m$ may be secured to the rear shovels only, or may be secured to the standards $d$.

To the drag-bars E, and immediately in front of the forward shovels, are secured the retreating knives K', which slant toward the shovels, and are adapted to part the trash in front of them. Just forward of these knives are the stalk-turners T, slanting in the same direction, and designed to assist the knives immediately back of them by turning the stalks out of their path, said turners being adapted to run on or close to the ground. The standards $d$ are strengthened by the brace-rods $o$, and placed in regular order on opposite sides of each drag-bar E, the front end of each shovel pointing to the rear side of the preceding one, the forward shovels by this arrangement casting aside the trash out of the path of the rear shovels.

In weeding and cultivating, the rear knives are not needed, and may be dispensed with, and when it is desired to plow deeper than usual the outer shovels may be placed on the inside.

G represents two upright standards secured to the drag-bars E, and encircled by a coiled spring, $e$.

To the frame-piece C is secured the tongue H, which is of ordinary split form, and also the studs or projections $i$, to which are loosely secured the movable arms or plates I, which are allowed a free lateral movement. To these arms I are pivotally secured the lifting-levers K, having a free vertical and lateral movement. Each lever K is provided on the outer side with a guide, $g$, between which and the lever K fits the upper portion of the standard G, the extreme upper end of the latter being provided with a cap, $n$, against which presses the lever K and guide when the lever is raised to lift the drag-bars E.

To the inner side of each of the levers K, and approximately the same length, is pivotally secured a spring-actuated lever, L, provided on its inner end with a pawl adapted to engage with the perforated segment M, secured to the movable arm or plate I. When the lever L is pressed toward the lever K, the pawl on the inner end of the lever L is withdrawn from the perforation in the segment M, and the lever K can then be raised to any suitable height, at the same time raising the drag-bars E and the shovels attached thereto. To the rear portion of the drag-bars E are secured the handles S, by which the shovels are laterally operated. If desired, a seat may be secured to the frame-piece C, as shown.

My invention is exceedingly simple in construction, can be easily operated, is efficient in use, and can be produced at a small initial cost.

It is evident that many slight changes may be made in my improvement without departing from the spirit of my invention; and hence I would have it understood that I do not limit myself to the exact construction shown and described, but consider myself at liberty to make such changes as fairly fall within the spirit and scope of my invention.

Having fully described my invention, what I claim as new, and desire to secure by Letters Patent, is—

1. In a weeding-machine, the combination, with the axle and a bail-piece, adjustably secured to the frame so as to be raised or lowered, and arms journaled at one end on the axle and secured at their outer ends to the bail, of drag-bars pivotally secured at their forward ends to the bail, and levers for raising and lowering said drag-bars, substantially as set forth.

2. The combination, with the vertically-adjustable bail and vertically and laterally adjustable drag-bars secured at their forward ends to the bail, of a lifting-lever pivoted to a laterally-adjustable plate or support pivoted to the main frame, substantially as set forth.

3. The combination, with the vertically-adjustable bail and vertically and laterally adjustable drag-bars, of a lifting-lever pivoted to a laterally-adjustable plate or support, a segment secured to said plate or support, and a holding-lever pivoted to the lifting-lever and adapted to engage said segment, substantially as set forth.

4. The combination, with the drag-bars E, lifting-lever K, rod G, and spring e, of the pivoted plate I, having a segment, M, secured thereto, and lever L, pivoted to lever K, and adapted to engage the segment M, substantially as set forth.

In testimony whereof I have signed this specification in the presence of two subscribing witnesses.

JOSEPH B. LADD.

Witnesses:
H. P. VROOMAN,
JOSEPH T. WARD.